United States Patent [19]
Beucler

[11] 3,753,722
[45] Aug. 21, 1973

[54] ANIMAL FEED SUPPLEMENT

[75] Inventor: Harlan L. Beucler, Wayzata, Minn.

[73] Assignee: Cargill, Incorporated, Minneapolis, Minn.

[22] Filed: Aug. 27, 1971

[21] Appl. No.: 175,493

Related U.S. Application Data

[63] Continuation-in-part of Ser. No. 816,195, April 15, 1969, abandoned.

[52] U.S. Cl. .......................... 99/2 ND, 99/6, 71/28
[51] Int. Cl. ........................ A23k 1/02, A23k 1/22
[58] Field of Search ...................... 99/2 N, 5, 6, 2; 71/26, 28–30; 260/555 R, 555 C; 106/162, 205; 127/29

[56] References Cited
UNITED STATES PATENTS

| | | |
|---|---|---|
| 2,748,001 | 5/1956 | Anderson et al. .................... 99/6 |
| 2,910,361 | 10/1959 | Kunz ........................................ 99/6 |
| 3,248,224 | 4/1966 | Loomis et al. ............................ 99/2 |
| 3,420,672 | 1/1969 | Appleman ................................. 99/6 |

*Primary Examiner*—Norman Yudkoff
*Assistant Examiner*—Curtis P. Ribando
*Attorney*—William E. Anderson, James R. McBride et al.

[57] ABSTRACT

A urea-mollases animal feed supplement containing less than 30 weight percent water and at least 25 weight percent urea solids.

18 Claims, 3 Drawing Figures

INVENTOR
HARLAN L. BEUCLER

Fitch, Even, Tabin, & Luedeka
ATTYS

INVENTOR
HARLAN L. BEUCLER

Fitch, Even, Tabin, & Luedeka
ATTYS.

3,753,722

ANIMAL FEED SUPPLEMENT

The present application is a continuation-in-part of U.S. Pat. Ser. No. 816,195, filed Apr. 15, 1969.

This invention relates generally to animal feed supplements, and more particularly, it relates to stable, flowable, nonfermentable liquid feed supplements containing molasses and urea, and to a method for the manufacture of such feed supplements.

Feed supplements for adding to the natural feed ration of ruminant animals are well known. Such supplements commonly contain a nonprotein source of nitrogen, and in addition, may contain vitamins, minerals, antibiotics and other desirable feed ingredients. Urea is the most commonly utilized source of nonprotein nitrogen in ruminant feed supplements. When the urea is ingested by a ruminant animal it undergoes hydrolysis and releases ammonia during the digestive process. The ammonia is converted into digestable protein by microorganisms present in the animal.

It is also well known to feed urea to ruminant animals in admixture with molasses. The sweetness of molasses makes a mixture of urea and molasses palatable to the animal. The molasses-urea mixture may be fed directly to the animal or may be mixed with the animal's grain or roughage ration.

Aqueous urea solutions have well-defined crystallization temperatures. The temperature at which molasses-urea mixtures change from fluid to solid is not so well defined, particularly if this transition temperature is a low temperature at which the molasses is viscous. The transition temperature of molasses-urea mixtures is commonly referred to by various names, such as "crystallization temperature," "fudge point" or "freezing point." The transition of a molasses-urea mixture from a fluid state to an apparent solid state is not believed to be entirely a crystallization mechanism. Consequently, the transition temperature wherein the described molasses-urea mixtures change from a fluid state to an apparent solid state will be referred to herein as the "oongealing temperature." A molasses-urea mixture is considered to be in a "solid state" when it is no longer flowable. As used herein, the term "flowable" refers to the capability of a particular molasses-urea mixture to be pumped using ordinary equipment. The flowability of a particular molasses-urea mixture is directly proportional to the temperature of the mixture, that is, the higher the temperature the more flowable and less viscous the mixture becomes.

Known molasses-urea liquid feed supplements generally contain less than about 25 percent by weight urea solids, and between about 30 and about 40 percent by weight water. Such compositions are conventionally prepared by mixing molasses with an aqueous urea solution containing 50 percent urea, a standard item of commerce. It is not considered practical to prepare molasses-urea feed supplements by dissolving solid urea in molasses since urea has a negative heat of solution, which would require the addition of excessive quantities of heat during dissolving of the urea in the molasses.

Molasses-urea feed supplements are usually prepared from high Brix molasses, e.g., molasses having a Brix of 85 or higher, or from standardized molasses, which has a Brix of 79.5. FIG. 1 is a graph of Brix versus average moisture of cane molasses. FIG. 1 represents the averaging of the moisture content of many molasses samples, and deviations in the actual moisture control of a given molasses sample from that of FIG. 1 can be expected. However, for most molasses samples, FIG. 1 should be accurate to within three percent. If the moisture content of molasses exceeds that of standardized molasses, which from FIG. 1 is about 26.5 percent, the molasses is susceptible to fermentation upon storage, particularly at elevated temperatures, e.g., above 80° F. Accordingly, conventional molasses-urea feed supplements containing 30 to 45 percent water are susceptible to fermentation.

Accordingly, it is a principal object of the present invention to provide an improved molasses-urea feed supplement containing increased concentrations of urea, and a convenient method of manufacturing such compositions. It is another object of the present invention to provide a molasses-urea feed supplement having an increased urea concentration and a relatively low water concentration. It is a further object of the present invention to provide a stable, flowable molasses-urea feed supplement having a sufficiently low water concentration that it is essentially nonfermentable. An additional object is to provide a method for the manufacture of a molasses-urea feed supplement which provides a nonfermentable, flowable product having high urea concentrations and low moisture concentrations.

These and other objects of the invention will become more clear from a careful reading of the following detailed description and the accompanying drawing, wherein.

Figure 1:
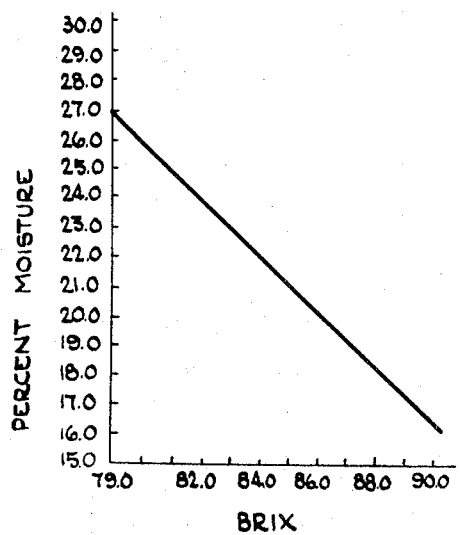
FIG. 1 is a graph depicting molasses Brix versus average percent moisture present in molasses.

Generally, the invention is directed to an animal feed supplement which includes a mixture of molasses (having a Brix in excess of 72) and an aqueous urea solution or anhydrous urea. The molasses-urea feed supplement is stable, and substantially nonfermentable under normal conditions. The feed supplement contains at least about 25 percent and preferably at least about 30 percent by weight urea solids, and not more than 30 percent by weight water. Depending upon the particular congealing temperature desired, the molasses-urea feed supplement may contain as little as 10 percent by weight water. The urea to water ratio of the molasses-urea feed supplement is at least 0.8 or above and is preferably greater than about 1.0.

The molasses-urea feed supplement is prepared by mixing an aqueous urea solution or anhydrous urea with molasses having a Brix of at least about 72. The urea is heated sufficiently that it is fluid when mixed with the molasses. The mixture is blended and agitated sufficiently to insure intimate mixing.

Several significant advantages, unattainable with prior molasses-urea feed supplements, are realized through the molasses-urea feed supplement described herein. The feed supplement contains an amount of urea which exceeds the maximum urea content which could be obtained heretofore at equal molasses solids concentrations. The feed supplement is therefore a more concentrated source of food energy. The feed supplement is stable and flowable at lower temperatures that is either the molasses or the urea solution used to form the mixture. For example, the molasses-urea mixture will have a congealing temperature that is lower than the crystallization temperature of the urea solution employed in the preparation of the mixture, and will have a lower viscosity than the viscosity of the molasses used in preparation of the mixture.

The feed supplement of the invention is nonfermentable under normally encountered storage conditions without the addition to the feed supplement of preservatives, such as phosphoric acid or phosphates. While not wishing to be bound by any theory it is believed that the non-fermentable characteristics of the feed supplement are due to the combination of novel features of the invention. These novel features include providing a feed supplement with a low moisture of less than about 30 percent, providing urea at a level of at least about 25 percent and providing a urea to moisture ratio of 0.8 or above. If a feed supplement is prepared which lacks the above indicated novel features, the feed supplement is not resistant to fermentation and fermentation occurs after a relatively short period at normally encountered storage conditions.

Another advantage of the molasses-urea feed supplement is that the volume required for storage of the mixture of the molasses and the urea solution is less than the volume required for storage of the molasses and a dilute urea solution separately. Surprisingly, the molasses-urea feed supplement has a higher fluidity (lower viscosity) than does a urea solution or molasses dispersion having an equivalent moisture.

It is also a surprising and unexpected result that the congealing temperature of the molasses-urea feed supplement is less than the crystallization temperature of a urea solution having an effective urea concentration equivalent to that of the feed supplement. As used herein the term "effective urea concentration" means the concentration of urea in the feed supplement divided by the sum of the water and urea concentrations in the feed supplement. For example, a feed supplement containing 30 percent urea and 22 percent total moisture would have an effective urea concentration of 30 divided by 22 plus 30 or about 58 percent. A 58 weight percent aqueous urea solution has a crystallization temperature of about 90° F. In a particular example of the described feed supplement containing 30 percent urea solids, 22 percent moisture and 48 percent molasses solids, i.e., a feed supplement having an effective urea concentration of 58 percent, the congealing temperature is about 50° F. The molasses-urea feed supplement is also advantageous in that it offers a convenient system for handling concentrated urea solutions and a high Brix molasses in the form of a flowable non-fermentable composition.

A further advantage of the feed supplement is that the feed supplement may be provided having any desired congealing temperature below about 160° F and down to less than about −10° F. It is preferred to provide feed supplements having a congealing tempeture below the lowest normally encountered ambient temperature of the geographic area where the feed supplement is to be utilized. Such normally encountered ambient temperatures may range from about 60° F to about 105° F in the summer and from about −10° F to about 80° F in the winter for areas within the United States. By providing the feed supplement with a congealing temperature below the ambient temperature, the feed supplement remains easily handleable and flowable at the ambient temperature and may be pumped. It is particularly preferred to provide feed supplements with congealing temperatures of 60° F or less so as to provide a flowable feed supplement at the ambient temperature conditions of most geographic areas during most seasons. Flowable feed supplements with congealing temperatures higher than ambient temperature may also be used if the feed supplement is kept heated or if the feed supplement is heated. It is preferred, however, that the feed supplement be provided with a congealing temperature below about 105° F under most conditions of use.

Any convenient form of molasses may be employed in the preparation of the feed supplement. It is contemplated that in most instances cane molasses will be utilized, but corn or hydrol molasses, beet molasses, citrus molasses, wood molasses, sorghum molasses are equally useful and may be substituted for all or part of the cane molasses. It is also contemplated to substitute corn steepwater concentrate or fish solubles for all or part of the molasses.

Cane molasses is generally available as high Brix molasses, e.g., a Brix of between about 84 and 92, and as standardized molasses which has a Brix of 79.5. In some instances the molasses may have a lower Brix, for example between 72 and 75, but at these lower Brix values the molasses is susceptible to fermentation. High Brix molasses is quite viscous and difficult to handle and pump, particularly at temperatures below about 70° F. Standardized molasses, prepared by the addition of water to high Brix molasses is less viscous and can be handled and pumped at temperatures as low as 40° F. The addition of further amounts of water to lower the Brix to below 79.5 permits handling of the molasses at low temperatures. However, as indicated at such lower Brix values the molasses is susceptible to fermentation upon exposure to elevated temperatures. The molasses-urea feed supplement of the present invention is not substantially susceptible to fermentation at levels of moisture of less than about 30 percent. However, to insure freedom from fermentation for extended periods of storage at elevated temperatures, e.g., above 80° F, it is preferred that the moisture be no greater than that of 79.5 Brix molasses, which, as previously indicated, is about 26.5 percent moisture.

Generally, in order to provide a multiple purpose feed supplement, capable of storage during the summer months, the water content of the supplement should not exceed the moisture content of standardized molasses, e.g., should not exceed about 25 to 27 percent by weight water to avoid fermentation problems at temperatures up to about 125° F. Notwithstanding the desirability of providing a water content below about 25 to 27 percent, known and available molasses-urea feed supplements contain between 30 and 45 percent water, the high water content being necessary to provide a high urea content in the feed supplement when urea is added in the form of the commonly available 50 percent urea solution.

Molasses-urea feed supplements as described herein are not susceptible to fermentation even when the molasses raw material has a Brix as low as about 72. Nonfermentable feed supplements containing as much as about 60 percent by weight urea solids and less than about 20 percent by weight water may readily be prepared from such low Brix molasses. However, for most purposes high Brix molasses, e.g., molasses having a Brix of about 85 or higher is used as the raw material.

In the preparation of the described molasses-urea feed supplement it is preferred to use urea solutions which have as high a level of urea as is readily available. Particularly preferred is the use of substantially pure urea containing substantially no water present, although urea solutions containing as little as 60 percent by weight urea may also be employed depending upon the Brix of the molasses and the desired congealing temperature of the feed supplement. In practice the use of aqueous urea solutions containing about 85 percent by weight urea solids have been found to be convenient.

It is important that the urea mixed with the molasses is sufficiently heated so that it is liquid. The addition of liquid urea provides for better admixture with the molasses. Further, since solid urea has a negative heat of solution, it is advisable to heat such urea sufficiently to cause the urea to be in solution. Otherwise it is necessary to heat the molasses, which can cause carmelization. Molten anhydrous urea has a melting point of about 272° F, and when pure or substantially pure urea is utilized as the raw material, the urea should be at a temperature above 272° F at the time of addition to the molasses, e.g., about 275° F. Similarly, when aqueous urea solutions are employed as a raw material, the temperature of the urea solution should be maintained above the crystallization temperature for such solutions. For example an aqueous 85 percent urea solution has a crystallization temperature of 198° F and an aqueous 75 percent urea solution has a crystallization temperature of 163° F. The urea is provided in the feed supplement at a level of at least about 25 percent by weight and preferably at a level of at least about 30 percent by weight. However, for reasons of palatability and nutrition, the urea should not constitute more than about 60 percent of the feed supplement.

Figure 2:
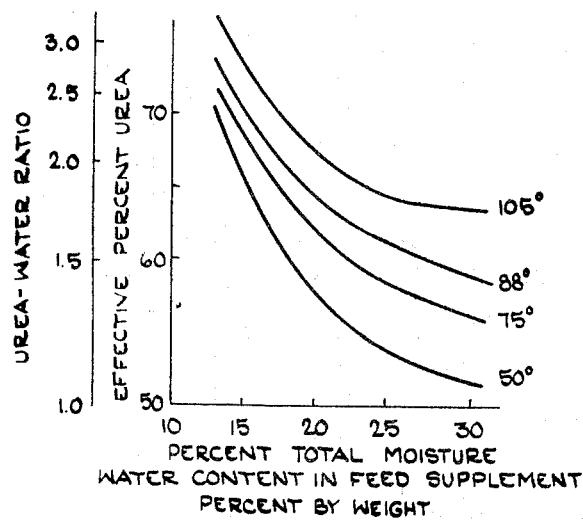
FIG. 2 is a graph illustrating four constant congealing temperature curves plotted as a function of weight percent water in the molasses-urea feed supplement versus the effective urea concentration, as herein defined, and the ratio of percent urea to percent water.

FIG. 2 is a graph illustrating four constant congealing temperature curves for molasses-urea feed supplements plotted as a function of the total water content of the molasses-urea feed supplement, versus the effective urea concentration and also the urea to water ratio. From this graph it is possible to determine the maximum urea to water ratio at a given total water concentration in order to attain a feed supplement having a particular congealing temperature. For example, if an 86 Brix molasses is chosen as the starting material for preparing the feed supplement, it is determined by means of FIG. 1 that the average water content of the molasses is about 20 percent. If a feed supplement having a congealing temperature of 50° F and a total moisture level of 20 percent is desired, the level of urea to be provided can be determined by means of FIG. 2. From FIG. 2 at 20 percent total water, it is seen that a urea to water ratio of about 1.4 should be used. This corresponds to an effective urea concentration of about 58 percent. The level of urea and water which need to be added can then be readily determined by simultaneous equations or by trial and error. For the example given, let $x$ represent the level of urea to be added in pounds and $y$ the level of water in pounds. Then, on the basis of 100 pounds of 86 Brix molasses the equations would be as follows:

$x/y + 20 = 1.4; y + 20 /x + y + 100 = 0.20$

When the equations are solved for $x$ and $y$ it is learned that 43.1 pounds of urea and 10.8 pounds of water, i.e., 53.9 pounds of an 80 percent by weight urea solution, need to be added to the 86 Brix milasses. The resultant molasses-urea feed concentrate will have a congealing temperature of 50° F, a urea to water ratio of 1.4 and a total moisture of 20 percent by weight. If a lower congealing temperature is desired, a lower ratio of urea to moisture would be used. Other constant congealing temperature curves may be interpolated or plotted for FIG. 2 to further increase the utility of FIG. 2 in providing feed supplements with particular characteristics. When a urea solution is used to prepare the feed supplement of the present invention, it is, of course, necessary to account for the water in the urea solution in arriving at a particular composition of the final feed supplement.

Figure 3:
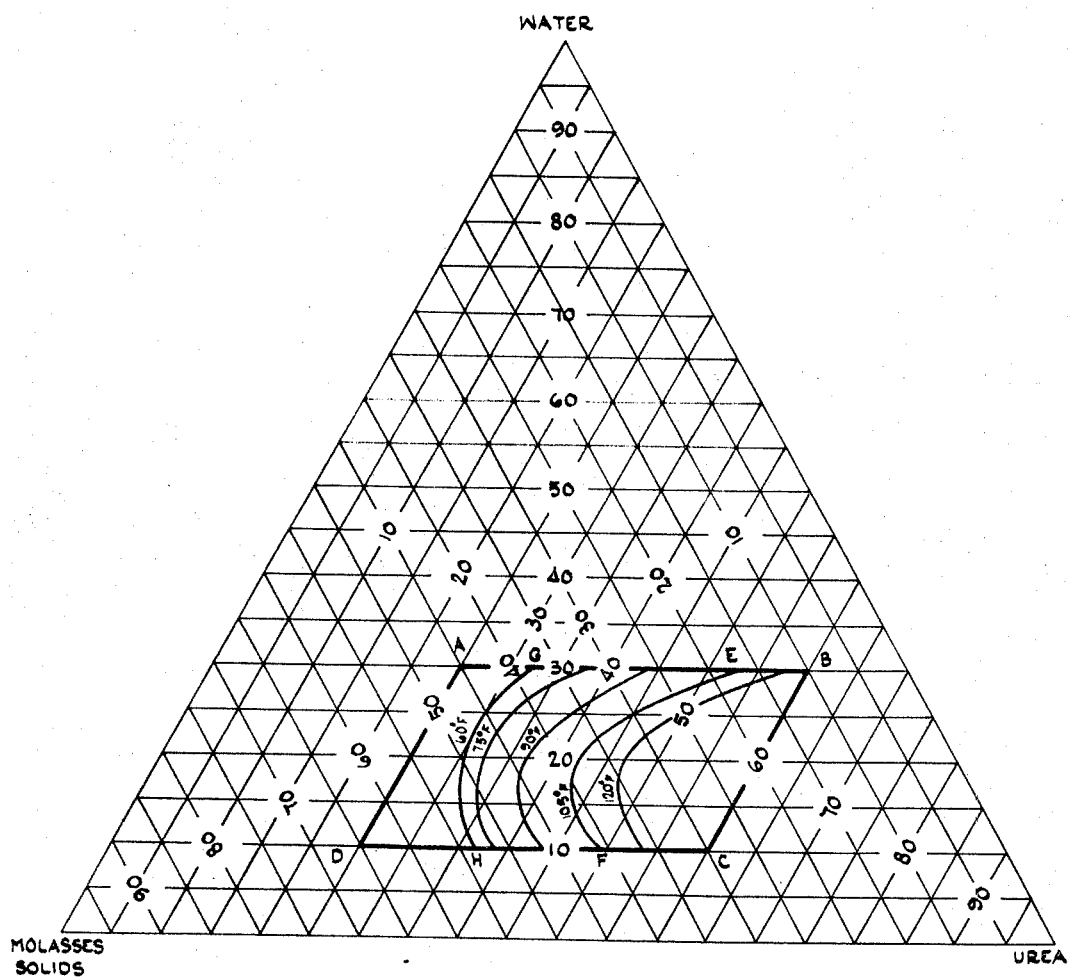
FIG. 3 is a graph on triangular coordinates defining the molasses-urea moisture compositions of the present invention.

As shown on the triangular plot of FIG. 3, the feed supplement of the invention consists essentially of urea, water and molasses solids. The feed supplement compositions of the invention are those contained within the parallelogram defined by points A, B, C, D. Such compositions contain 25 percent to 60 percent of urea, 10 percent to 30 percent water and 10 percent to 65 percent molasses solids, all percentages by weight. Also shown in FIG. 3 are curves representing constant congealing temperature compositions for congealing temperatures of 60° F, 75° F, 90° F, 105° F and 120° F. Other constant congealing temperature curves can be interpolated or plotted. Preferred feed supplement compositions are those which have a congealing temperature of less than 105°F. Such preferred compositions are within the area defined by three sides of the parallelogram (AE, AD and DF) and the constant congealing temperature curve for 105° F (EF). The points defining this area are A, E, F, D. Particularly preferred feed supplement compositions are those having a congealing temperature of less than about 60°F. Such compositions fall within the area of FIG. 3 defined by the lines between points A, G, H. D.

The following examples illustrate various feed supplement mixtures prepared by combining molten urea and urea solutions having various water levels with high Brix molasses and with standardized molasses. In all instances, percentages are percent by weight.

EXAMPLE I

Pure urea, initially at a temperature of 275° F, was added gradually to molasses having a Brix of 86, initially at a temperature of 72° F. The molasses was agitated during addition of the molten urea and the resultant mixture was cooled to determine the congealing temperature. Various mixtures were prepared in the above manner to provide the information for Table 1 below.

TABLE 1

| Urea to moisture ratio | Congealing temp. urea-molasses mixture | % Urea in mixture | % Molasses solids in mixture | % Water in mixture |
|---|---|---|---|---|
| 2.34 | less than −10°F | 32.0 | 54.3 | 13.7 |
| 2.56 | 75°F | 34.0 | 52.7 | 13.3 |
| 3.31 | 87°F | 40.0 | 47.9 | 12.1 |
| 4.95 | 116°F | 50.0 | 39.9 | 10.1 |

EXAMPLE II

Further molasses-urea feed supplements were prepared by the method of Example I except that an 85 percent urea solution was added to molasses having a Brix of 86. The urea solution was maintained at a temperature of 200° F and the molasses was initially at a temperature of 72° F during the addition of the urea. Various proportions of urea and molasses were prepared to provide the information for Table 2 below.

TABLE 2

| Urea to moisture ratio | Congealing temp. urea-molasses mixture | % Urea in mixture | % Molasses solids in mixture | % Moisture in mixture |
|---|---|---|---|---|
| 1.37 | less than −10°F | 25.5 | 55.9 | 18.6 |
| 1.88 | 8°F | 34.0 | 47.9 | 19.1 |
| 2.41 | 104°F | 42.5 | 39.9 | 17.6 |

EXAMPLE III

The method of Example I was used to prepare additional feed supplement mixtures, with the exception that an 85 percent urea solution was added to standardized molasses having a Brix of 79.5. The urea solution was maintained at a temperature of 200° F during the addition of the urea. Various samples were prepared and the information from each sample is recorded below in Table 3.

TABLE 3

| Urea to moisutre ratio | Congealing temp. of mixture | % Urea in mixture | % Molasses solids in mixture | % water in mixture |
|---|---|---|---|---|
| 1.10 | less than −10°F | 25.5 | 51.4 | 23.1 |
| 1.31 | 50°F | 29.7 | 47.7 | 22.6 |
| 1.55 | 73°F | 34.0 | 44.0 | 22.0 |
| 1.77 | 89°F | 38.2 | 40.4 | 21.4 |
| 2.04 | 108°F | 42.5 | 36.7 | 20.8 |
| 2.60 | 131°F | 51.0 | 29.1 | 19.6 |
| 3.21 | 156°F | 59.5 | 22.0 | 18.5 |

EXAMPLE IV

The method of Example I was used to prepare additional feed supplement mixtures, with the exception that a 75 percent urea solution and molasses having a Brix of 79.5 was used. The urea solution was maintained at a temperature of 165° F and the molasses was initially at a temperature of 72° F during the addition of the urea. Sufficient mixtures were prepared to provide the information set forth below in Table 4.

TABLE 4

| Urea to moisture ratio | Congealing Temp. of mixture | % Urea in mixture | % Molasses Solids in mixture | Total % water in mixture |
|---|---|---|---|---|
| 1.10 | less than −10°F | 26.2 | 47.8 | 26.0 |
| 1.15 | 48°F | 30.0 | 44.0 | 26.0 |
| 1.30 | 62°F | 33.7 | 40.4 | 25.8 |
| 1.45 | 76°F | 37.5 | 36.7 | 25.8 |
| 1.60 | 88°F | 41.2 | 33.1 | 25.7 |
| 1.90 | 110°F | 48.7 | 25.7 | 25.6 |
| 2.22 | 130°F | 56.2 | 18.3 | 25.3 |

EXAMPLE V

The method of Example I was used to produce additional feed supplement mixtures in accordance with the invention, except that a urea solution containing 70 percent urea and molasses having a Brix of 79.5 was used. The urea solution was maintained at a temperature of 140° F and the molasses was initially at a temperature of 72° F during the addition of the urea. Sufficient mixtures were prepared to provide the data set forth below in Table 5.

TABLE 5

| Urea to moisture ratio | Congealing temp. of mixture | % Urea in mixture | % Molasses solids in mixture | Total % water in mixture |
|---|---|---|---|---|
| .88 | 20°F | 24.5 | 47.7 | 27.8 |
| 1.00 | 48°F | 28.0 | 44.0 | 28.0 |
| 1.00 | 48°F | 28.0 | 44.0 | 28.0 |
| 1.12 | 50° | 31.5 | 40.4 | 28.1 |
| 1.24 | 66°F | 35.0 | 36.7 | 28.3 |
| 1.14 | 80°F | 38.0 | 33.0 | 29.0 |
| 1.47 | 88°F | 42.0 | 29.4 | 28.6 |
| 1.58 | 92°F | 45.5 | 25.7 | 28.8 |
| 1.80 | 104°F | 52.5 | 18.4 | 29.1 |

A portion of each of the mixtures of the foregoing examples was stored at ambient temperatures for a period of 12 months. A further portion of each of the mixtures was stored at an elevated temperature of 98° F for a period of 6 months. None of the examples stored at either temperature showed noticeable fermentation.

It is usually desirable to increase the moisture level of the feed supplement of the invention just prior to feeding to provide a more acceptable flavor to the animal. While the feed supplement of the invention consists essentially of urea, molasses, solids and water, additional materials may be added to the feed supplement to provide particular characteristics. Materials such as vitamins, minerals, antibiotics or other medicinal ingredients may be added to the feed supplement mixture.

The feed supplement of the present invention is a significant advance in the art of feed supplement materials for ruminant animals. A given level of urea and molasses can be combined into a feed supplement in accordance with the present invention and stored in a reduced volume. The feed supplement of the invention can be stored without congealing at lower temperatures than either the urea or the molasses itself. A fluid or flowable feed supplement material at ambient temperatures can be produced if desired. The feed supplement mixtures are stable and resistant to fermentation and provide increased stability for other feed supplement materials combined therewith.

What is claimed is:

1. A stable, substantially non-fermentable animal feed supplement comprising an aqueous mixture of molasses and urea, said mixture containing from about 10 percent to less than about 30 percent by weight water and at least about 25 percent by weight urea, said molasses prior to admixture having a Brix of at least about 72 and the ratio of urea to water in said mixtures being greater than 0.8.

2. A feed supplement in accordance with claim 1 wherein said ratio of urea to water in said mixture is greater than about 1.0.

3. A feed supplement in accordance with claim 1 wherein said mixture contains less than about 26.5 percent by weight water.

4. A feed supplement in accordance with claim 1 wherein said urea is provided from a urea source selected from urea solutions which contain at least about 60 percent urea and pure urea.

5. A feed supplement in accordance with claim 1 wherein said feed supplement has a congealing temperature of less than about 105° F.

6. A feed supplement in accordance with claim 1 wherein said feed supplement has a congealing temperature of less than about 60° F and wherein said feed supplement is pumpable at ambient temperatures.

7. A feed supplement in accordance with claim 1 wherein said urea is present at a level of at least about 30 percent by weight urea.

8. A feed supplement in accordance with claim 1 wherein said urea is provided by an aqueous urea solution having at least about 70 percent urea and said molasses is about 86 Brix, said urea being present at a level of about 36 percent by weight in said feed supplement and said ratio of urea to water in said feed supplement is about 1.5.

9. A method for preparing a stable, substantially non-fermentable animal feed supplement, comprising providing a urea source selected from aqueous urea solutions having at least about 60 percent urea or pure urea in a fluid condition, providing molasses having a Brix of at least about 72, and blending said urea source and said molasses to provide a feed supplement consisting essentially of an aqueous mixture of molasses and urea, controlling the moisture of said urea source and said molasses to provide from about 10 percent to less than 30 percent moisture in said feed supplement and said urea source being provided at a level sufficient to establish at least about 25 percent urea in said feed supplement and a ratio of urea to water in said feed supplement of at least 0.8.

10. A method in accordance with claim 9 wherein said ratio of urea to water is at least about 1.0.

11. A method in accordance with claim 9 wherein the moisture of said feed supplement is less than about 26.5 percent.

12. A method in accordance with claim 9 wherein said urea source is a urea solution having at least about 70 percent urea.

13. A method in accordance with claim 9 wherein said feed supplement has a congealing temperature of less than about 105° F.

14. A method in accordance with claim 9 wherein said feed supplement has a congealing temperature of less than about 60° F and said feed supplement is pumpable at ambient temperatures.

15. A method in accordance with claim 9 wherein said urea source is present at a level sufficient to provide at least about 30 percent urea in said feed supplement.

16. A feed supplement in accordance with claim 1 wherein said composition is within the area defined by the points A, E, F and D of FIG. 3.

17. A feed supplement in accordance with claim 1 which has a composition within the area defined by points A, G, H and D of FIG. 3.

18. A composition of matter suitable as a feed supplement for ruminants consisting of at least about 25 percent by weight of urea, less than 30 percent by weight of water, and 39.9 percent by weight of molasses, said molasses having a Brix in excess of 72.

* * * * *

UNITED STATES PATENT OFFICE
CERTIFICATE OF CORRECTION

Patent No. 3,753,722          Dated  August 21, 1973

Inventor(s) Harlan L. Beucler

It is certified that error appears in the above-identified patent and that said Letters Patent are hereby corrected as shown below:

In the Abstract, line 1 "mollases" should read -- molasses --.

Column 7, line 14, Table 2, "8°F should be -- 82°F --.

Column 8, line 8, Table 5, the line beginning "1.00" is shown twice.

Column 8, line 9, "50°" should be -- 50°F --.

Signed and sealed this 27th day of November 1973.

(SEAL)
Attest:

EDWARD M. FLETCHER, JR.  
Attesting Officer

RENE D. TEGTMEYER  
Acting Commissioner of Patents